US009796616B2

(12) United States Patent
Coppola et al.

(10) Patent No.: US 9,796,616 B2
(45) Date of Patent: Oct. 24, 2017

(54) APPARATUS AND METHOD FOR PRODUCING LAMINATED GLASS SHEET

(71) Applicant: Corning Incorporated, Corning, NY (US)

(72) Inventors: Frank Coppola, Horseheads, NY (US); Vladislav Yuryevich Golyatin, Avon (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/905,926

(22) PCT Filed: Aug. 2, 2013

(86) PCT No.: PCT/US2013/053357
§ 371 (c)(1),
(2) Date: Jan. 18, 2016

(87) PCT Pub. No.: WO2015/016935
PCT Pub. Date: Feb. 5, 2015

(65) Prior Publication Data
US 2016/0159677 A1    Jun. 9, 2016

(51) Int. Cl.
*C03B 17/06* (2006.01)
*C03B 17/02* (2006.01)
*C03C 3/087* (2006.01)
*C03C 3/093* (2006.01)

(52) U.S. Cl.
CPC ............ *C03B 17/064* (2013.01); *C03B 17/02* (2013.01); *C03C 3/087* (2013.01); *C03C 3/093* (2013.01)

(58) Field of Classification Search
CPC ....................................................... C03B 17/06
See application file for complete search history.

(56) References Cited

U.S. PATENT DOCUMENTS

| 4,204,027 A | 5/1980 | Simon |
| 4,214,886 A | 7/1980 | Shay |
| 2001/0055930 A1* | 12/2001 | Ott .......................... C03B 17/04 |
| | | 65/29.12 |
| 2006/0127679 A1 | 6/2006 | Gulati |

(Continued)

FOREIGN PATENT DOCUMENTS

| JP | 2007112684 | 5/2007 |
| WO | 2012005941 | 1/2012 |

(Continued)

OTHER PUBLICATIONS

International Search Report, issued in connection with corresponding PCT application No. PCT/US2013/053367, dated Apr. 9, 2014.

*Primary Examiner* — Cynthia Szewczyk
(74) *Attorney, Agent, or Firm* — John L. Haack

(57) ABSTRACT

An apparatus for forming laminated sheet glass, including: a lower pipe and a first upper pipe separated by a first gap on one side and second gap on the other side, the apparatus being configured so that the position of the lower pipe relative to the first upper pipe are each independently adjustable to control the dimensions of the first gap, the second gap, or both, as defined herein. Also disclosed is a method for forming laminated sheet glass or articles thereof using the aforementioned glass laminating apparatus, as defined herein.

13 Claims, 9 Drawing Sheets

(56) References Cited

U.S. PATENT DOCUMENTS

| | | |
|---|---|---|
| 2007/0190340 A1 | 8/2007 | Coppola |
| 2010/0212360 A1 | 8/2010 | Delia |
| 2011/0126591 A1* | 6/2011 | Chalk .................. C03B 17/067 65/84 |
| 2013/0102228 A1 | 4/2013 | Tsuda |

FOREIGN PATENT DOCUMENTS

| | | | |
|---|---|---|---|
| WO | WO 2014018838 A2 * | 1/2014 | ............. C03B 17/02 |
| WO | 2014186196 | 11/2014 | |

* cited by examiner

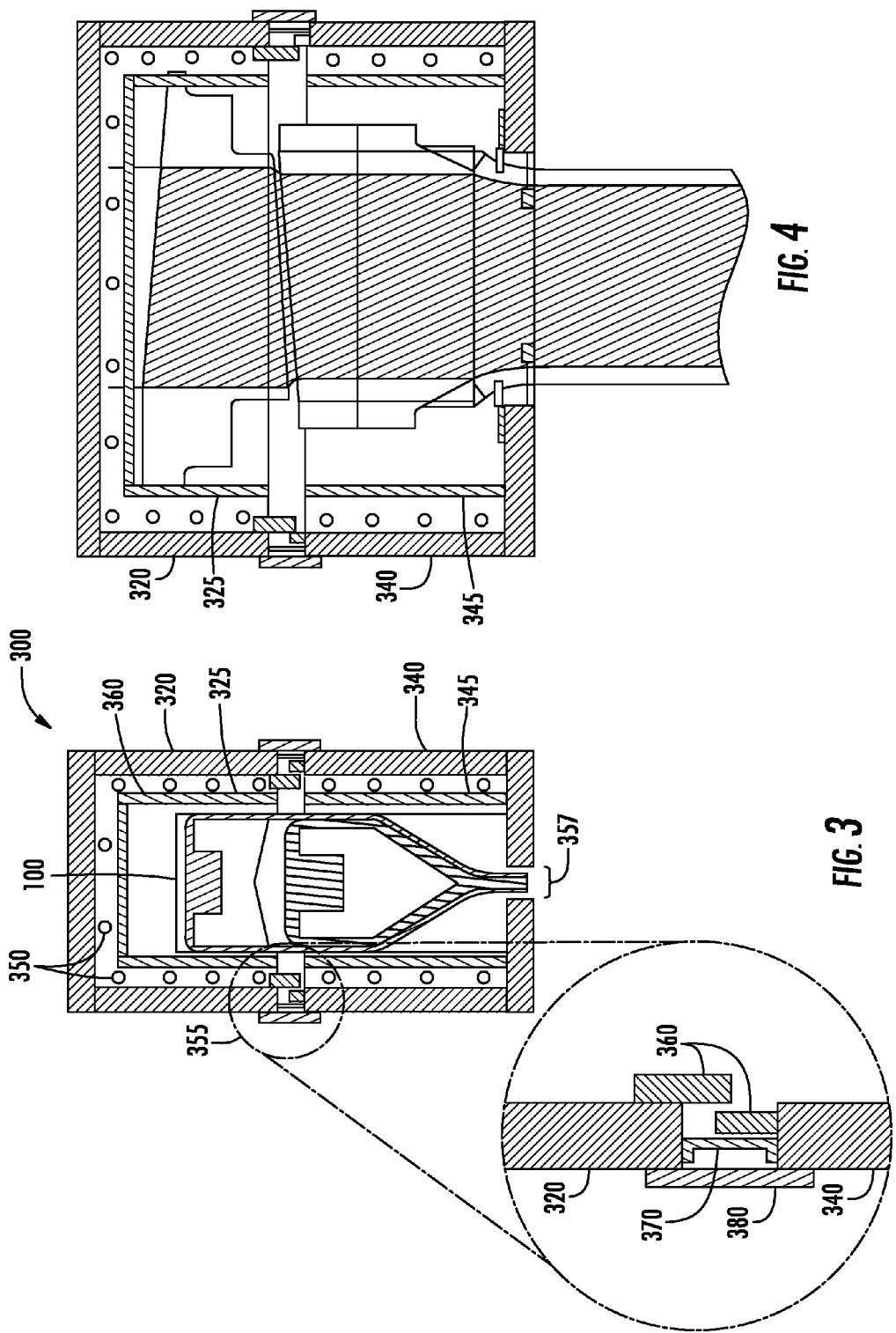

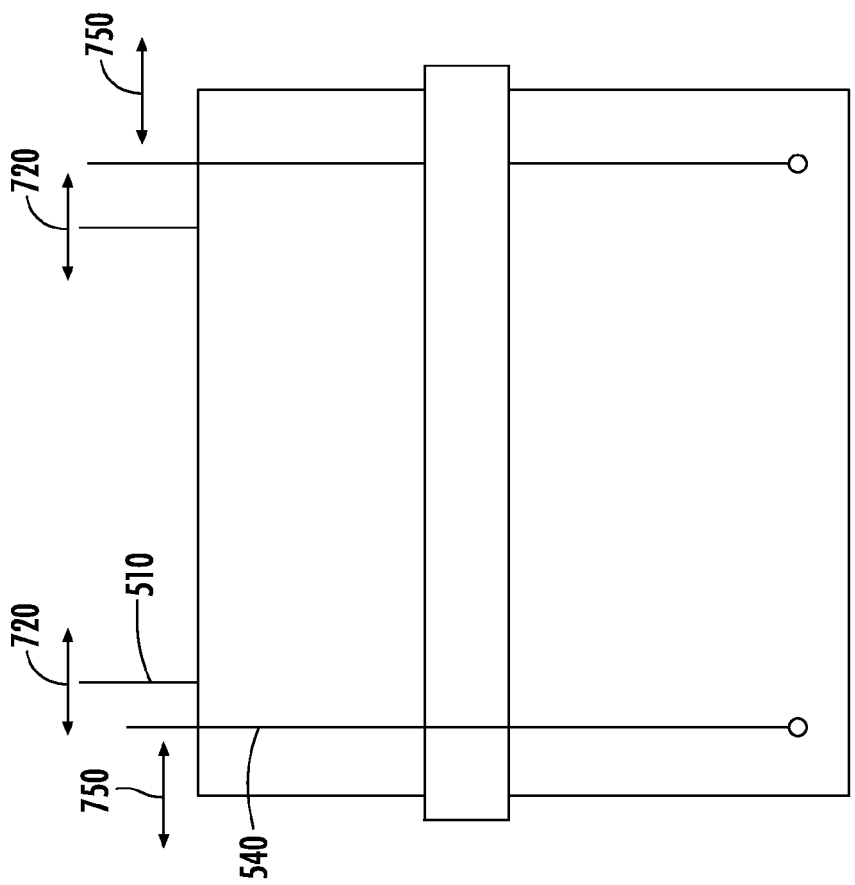
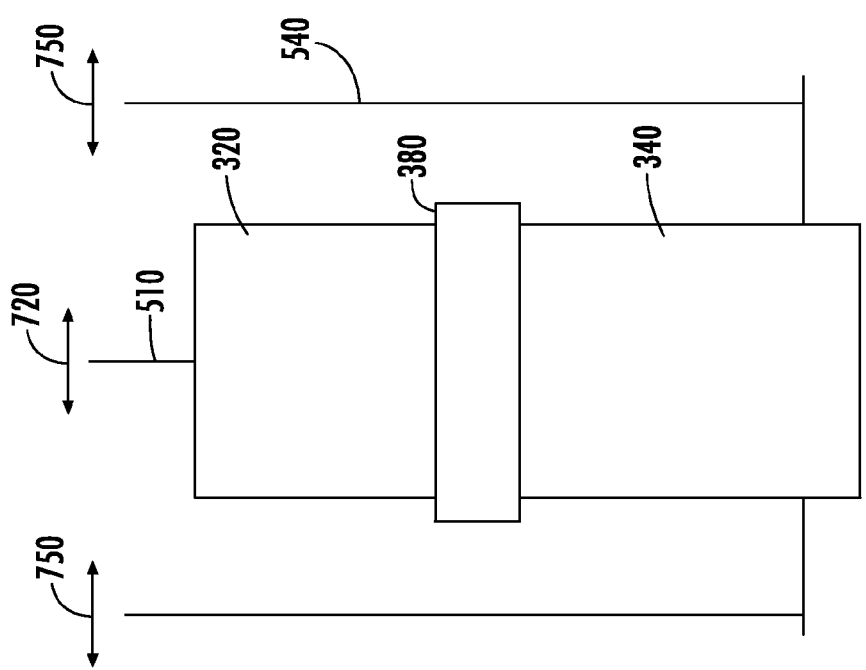

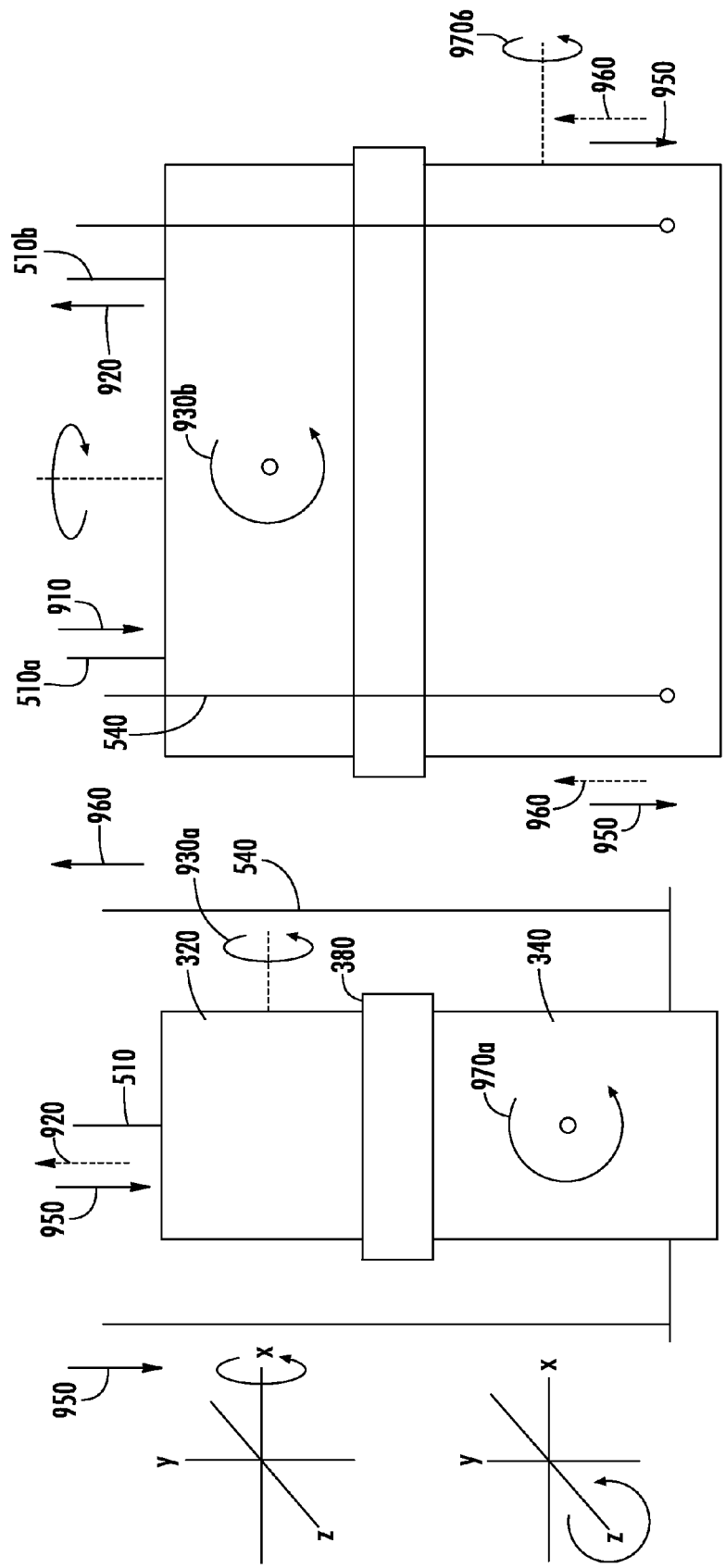

APPARATUS AND METHOD FOR PRODUCING LAMINATED GLASS SHEET

CROSS-REFERENCE TO RELATED APPLICATIONS

This application is related to commonly owned and assigned U.S. Pat. No. 8,007,913, issued Aug. 30, 2011, to Coppola, et al., entitled "Laminated Glass Articles and Methods of Making Thereof"; U.S. Ser. No. 13/479,701, filed May 24, 2012, now U.S. Pat. No. 8,646,291, to Coppola, et al., entitled "Apparatus and Method for Control of Glass Streams in Laminate Fusion"; and U.S. Ser. No. 61/676,028, filed Jul. 26, 2012, now U.S. Pat. No. 9,193, 617, to Kersting, et al., entitled "Refractory Liner Structure and Use in Glass Fusion Draw," which content is relied upon and incorporated herein by reference in its entirety, but does not claim priority thereto.

BACKGROUND

The disclosure generally relates to an apparatus and method for laminate fusion glass manufacture.

SUMMARY

The disclosure provides an apparatus and method for controlling the glass streams in laminate fusion glass manufacture. More particularly, the disclosure provides an apparatus and method for controlling the relative spatial orientation of an upper clad isopipe ("clad pipe") with respect to a lower core isopipe ("core pipe") in the laminate fusion process. Control of the relative spatial orientation of the pipes permits control of the respective glass streams and the resulting glass laminate layer thicknesses. In embodiments, the clad pipe and core pipe can be configured such that each pipe can be independently moved or adjusted with respect to the other pipe. In embodiments, the clad pipe and core pipe can be configured within a chamber in a muffle housing ("muffle") so that the upper portion of the muffle and lower portion of the muffle can each be independently moved or adjusted with respect to the other in space to control the respective clad and core glass streams and the resulting glass laminate layer thicknesses.

BRIEF DESCRIPTION OF DRAWINGS

In embodiments of the disclosure:

FIG. 3 shows an exemplary schematic of the end view cross-section of the double fusion apparatus (100) of FIG. 1, within the disclosed apparatus (300) and process.

FIG. 4 shows a schematic cross section in side view of the disclosed apparatus incorporating the laminate draw fusion apparatus shown in FIGS. 1 and 2 within the disclosed apparatus (300) of FIG. 3.

FIG. 7 illustrates an exemplary schematic in an elevation end view of one disclosed apparatus having independent overhead mechanisms for adjusting the relative spatial relation, which is another relative translation movement, of the upper portion (320) of the muffle and the lower portion (340) of the muffle.

FIG. 8 illustrates an exemplary schematic in an elevation side view of the disclosed apparatus movement of FIG. 7 having independent overhead mechanisms for adjusting the relative spatial relation (i.e., controlled "swaying") of the upper portion of the muffle and the lower portion of the muffle.

FIG. 9 illustrates an exemplary schematic in an elevation end view of one disclosed apparatus having independent overhead mechanisms (510, 540) for adjusting the relative spatial relation, specifically rotation, of the upper portion (320) (or "tilt" (930a)) of the muffle and the lower portion (340) (or "roll" (970a)) of the muffle.

FIG. 10 illustrates in an elevation side view the disclosed apparatus movement described for FIG. 9.

DETAILED DESCRIPTION

Figure 2:
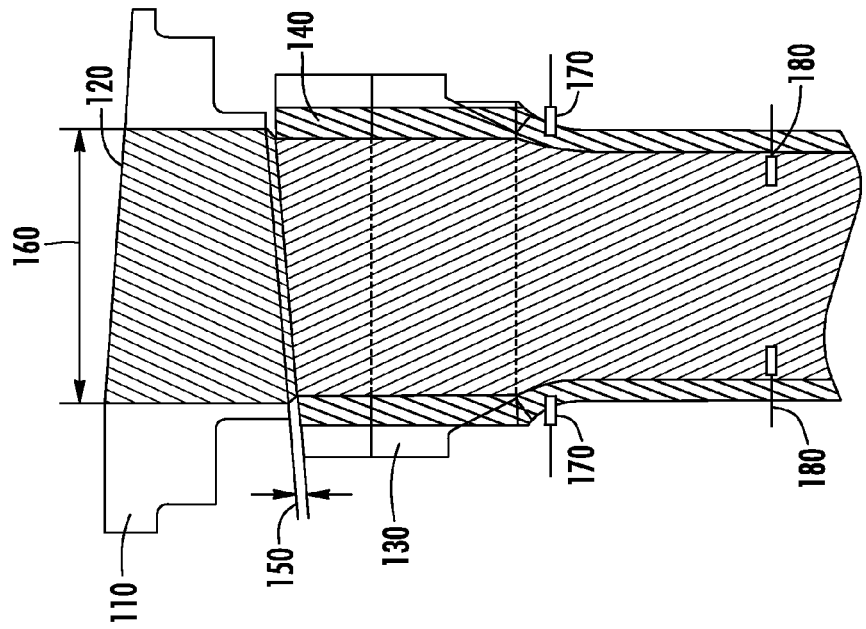
FIG. 2 shows an exemplary side view of the PRIOR ART double fusion apparatus (100) and process of FIG. 1.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus, and the disclosed method of making and using provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Optional" or "optionally" means that the subsequently described event or circumstance can or cannot occur, and that the description includes instances where the event or circumstance occurs and instances where it does not.

"Consisting essentially of" in embodiments can refer to, for example:

an apparatus having independently adjustable isopipes, refractory liner, or muffle sections for making a laminated glass article; and a method of making a laminated glass article using the disclosed apparatus having independently adjustable isopipes, refractory liner, or muffle sections, as defined herein.

The apparatus having independently adjustable isopipes, refractory liner, or muffle sections for making the laminated glass article, the method of making the laminated glass article, the resulting laminated glass article, the compositions, or the formulations, of the disclosure can include the components or steps listed in the claim, plus other components or steps that do not materially affect the basic and novel properties of the compositions, articles, apparatus, or methods of making and use of the disclosure, such as particular glass compositions, particular additives or ingredients, a particular agent, a particular structural material or component, a particular melt or draw condition, or like structure, material, or process variable selected.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, and like aspects, and ranges thereof, are for illustration only; they do not exclude other defined values or other values within defined ranges. The apparatus and methods of the disclosure can include any value or any combination of the values, specific values, more specific values, and preferred values described herein, including explicit or implicit intermediate values and ranges.

This disclosure relates to the manufacture of glass sheet in a Laminate Fusion Draw Machine (LFDM). More particularly the disclosure expands on the known method and apparatus for creating laminate sheet glass (see U.S. Pat. No. 4,214,886).

Figure 1:
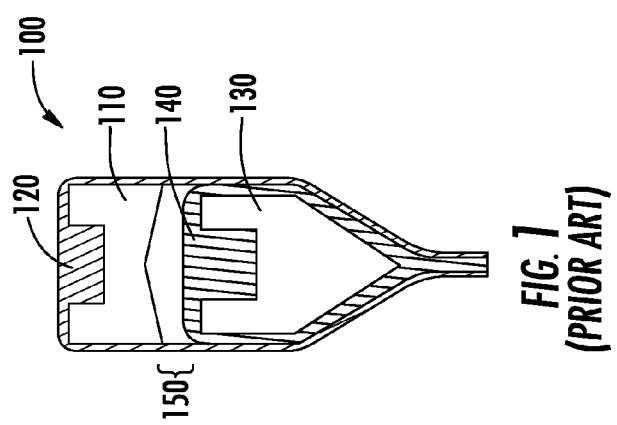
FIG. 1 shows a schematic in cross section of a PRIOR ART double fusion apparatus (100) and process having the clad glass stream (120) from the upper isopipe (110) streaming onto the core glass stream (140) from the lower isopipe (130) across the gap (150).

The disclosure provides an improved alternative to the apparatus and process for laminate glass, in which a three layer glass composite was formed with a single fixed (clad) isopipe overflowing hot fluid glass on top a fusion draw process (core) (FIG. 1).

Since the isopipes for the original patented forming apparatus were designed for a specific glass composition and flow rate, they were fixed in space, and were not moveable relative to each other. The use of the apparatus was operationally limited to, for example, a particular glass pair, thickness ratio, flow rate, and viscosity.

When the viscosity or flow rate of the clad glass is different from the design conditions, the glass confluence between clad and core streams becomes unstable and incapable of forming a quality glass laminate sheet. The disclosed apparatus and methods provide for multiple glass combinations and thickness ratios (core/clad as defined herein), while ensuring a stable confluence of glass streams.

By properly scaling the flow rate and viscosity of each glass stream, the same apparatus can be used to make laminate sheets having multiple thickness ratios and glass compositions within the same run or different runs. Additionally, when the change of viscosity or flow rate becomes limited by the thermal environment, tilting the clad pipe relative to the core pipe and tilting both pipes in concert can further extend the process window. The ability to cross tilt the clad isopipe provides a control to ensure clad to clad symmetry or desired asymmetry of the laminate product.

The disclosed apparatus and methods provide substantial flexibility in a single forming apparatus to form glass laminates having, for example:

substantial thickness uniformity;

a wide range of thickness ratios (core/clad as defined herein); and a wide range of glass compositions that are symmetric or asymmetric.

In embodiments, two types of asymmetric laminates can be made, for example, one type having one clad layer thicker than the other clad layer; and one type having the clad, the core, or both, changing thickness from edge to edge (e.g., inlet edge is thicker than compression edge).

Selection of the proper gap between the isopipes is a significant parameter in the laminate fusion process in ensuring stable glass confluence. The optimal gap is a function of both the clad and core glasses viscosities and flow rates. Consequently, the ability to adjust the gap between the isopipes allows a manufacturer to use a wider variety of glass compositions and flow rates, while using the same apparatus.

Additionally, when the change of viscosity or flow rate becomes limited by the thermal environment, tilting the clad pipe relative to the core pipe or tilting both of them in concert can further extend the process window. For example, in an experiment with the apparatus described in U.S. Pat. No. 4,214,886, a fixed 1½" gap was used between the isopipes. For clad and core glasses with the same viscosity, this process worked well. However, when the composition of the clad glass was changed to a lower viscosity, instability of the glass confluence was observed, resulting in thickness non-uniformity. The present disclosure addresses this issue by providing the ability to independently adjust the isopipe gap.

Another advantage of the disclosed apparatus and methods is the ability to cross tilt the clad isopipe, which allows one to control clad to clad symmetry, or desired asymmetry, of the produced laminate. If targeting strengthened applications and glass composition pairs (i.e., core and clad) having significant differences in, for example, Coefficient of Thermal Expansion (CTE), even a slight variation in clad thickness can cause substantial deformation. Therefore, control of clad to clad flow variation is addressed through the cross "tilt" (or "roll") of the clad isopipe.

The disclosure is not limited to the case with only two isopipes and can be adapted for use with multi-layer laminates mentioned in U.S. Pat. No. 4,214,886. Consequently, each isopipe in the stack can have all or part of relative movement capabilities described here.

The disclosure relates to a single linear fusion draw machine (LFDM) system that provides precise adjustment of the clad isopipe, the core isopipe, or both, to allow for varying combinations of glass compositions and thickness ratios, without lost time for shut down or draining the system. In alternative embodiments, the respective portions of the muffle, the dog house (i.e. liner), or the respective clad and core isopipes can be independently adjusted to achieve the same precise adjustment objectives. The following adjustments are provided by the disclosure (see also Table 2):

Gap height adjustment between two isopipes, for example, from 0.5" to 3";

Each isopipe can have "tilt" capability allowing for the clad isopipe to tilt relative to the core isopipe, or both isopipes in combination;

Each isopipe can have "roll" capability (this adjustment is particularly significant for the clad isopipe to control laminate symmetry or non-symmetry as desired); and Each isopipe can have horizontal movement ("left-right") capability (this is useful for alignment of the equipment to allow for thermal expansion, and positioning the clad ribbon relative to the core ribbon. Additionally, the horizontal or "left-right" movement capability can be useful in exploring process sensitivity of the glass confluence and developing superior operating parameters).

The fusion laminate process as disclosed in U.S. Pat. No. 4,214,886, combines two glasses of different compositions into a two (2) or three (3)-layered laminated sheet. It has been determined by, for example, oil model simulation, mathematical modeling, and observation, that the drop distance of the glass stream or flow from the upper pipe, which provides the source of the cladding glass or outer layer glass, onto the glass in the lower pipe, which provides the source of the core glass, is significant in maintaining excellent glass quality of the final laminated sheet. Although not limited by theory, it is generally believed that the velocity of the two liquid glass streams when they come together must be nearly equal. The drop distance, coupled with the liquid glass viscosity, establishes the velocity of the upper glass stream. Additionally, the distance between the two pipes is preferably uniform, or very close to uniform. Stated alternatively, the distance between the lowest portion of the upper pipe and the upper most portion of the lower pipe is substantially equidistant, or has a gap or separation dimension between the pipes that is approximately the same. Satisfying at least these criteria call for an apparatus having a wide range of motion. When the drop distance between the lowest portion of the upper pipe and the upper most portion of the lower pipe is not substantially equidistant laminate defects can result. In embodiments, the disclosed apparatus can correct differences in the separation dimension, i.e., the pipe gap, the pipe tilt, the pipe roll or combinations thereof, between the upper and lower pipes.

In embodiments, the disclosure provides an apparatus and method for controlling the confluence of glass streams in laminate fusion processing and the quality of the resultant laminate glass sheet. In embodiments the disclosed apparatus can include baffles (a.k.a., confluence adjustment plates (CAPs)) as disclosed in co-pending U.S. Ser. No. 13/479,701, that can move, for example, vertically, such as in recesses or slots, at the bottom region of the upper pipe. These baffles can be fabricated from any of a variety of suitable materials and can be located at or along both long- or lateral-sides of the upper pipe. In embodiments, the baffles preferably can be the same length as the pipe root. The height of the baffles is sufficient to accommodate the required movements and separations between the upper pipe and lower pipe. In embodiments, the adjustment for the pipe gap and the pipe tilt can be provided by, for example, rods at the distal ends of each baffle, and which rods can project to the exterior of the apparatus.

In embodiments, the disclosure provides an apparatus for forming laminated sheet glass, comprising:

a lower pipe that provides a first glass stream of the core of the laminate; and a first upper pipe that provides a second glass stream onto the first glass stream, the second glass stream forms a first outer clad layer on the inner core of the laminate;

a muffle comprising:
  a first upper portion having a top and at least two long sides; and
  a second lower portion having an open bottom and at least two long sides, the first and second muffle portions define a chamber occupied by the first upper pipe and the lower pipe respectively, i.e., the muffle provides a thermally insulated chamber that houses the isopipes;

a refractory liner (the dog house) situated between the enclosure formed by the muffle and the chamber occupied by the first upper pipe and lower pipe;

at least one gap seal, that is, the gap seal(s), situated near the gap between the bottom of the first upper portion and the top of the second lower portion of the muffle;

at least one heat source (e.g., a heater element, for example, a glow bar, or like heating element) within at least one of (or preferably each of or both) the first upper portion and the second lower portion of the muffle; and an adjustment system (that is, an adjustable support and movement system) operably adapted to change the relative position of at least one of:

the upper portion of the muffle with respect to the lower portion of the muffle;

the first weir with respect to the second weir of the first upper pipe;

a first gap and a second gap between the first upper pipe and the lower pipe; and combinations thereof.

The top of the lower pipe and the bottom of the first upper pipe are separated from each other by a first gap on one long side and a second gap on the other long side. The position of the lower pipe and the position of the first upper pipe are each independently adjustable to control the dimensions of the first gap, the second gap, or both. The position of the upper pipe can be adjusted to change the relative position of the first weir with respect to the second weir of the upper pipe to control the dimensional thickness of the clad glass on the core glass.

The adjustment system independently supports each of the upper and lower muffle portions, for example, from above, below, a side, an edge, a corner, or a combination thereof. The adjustment system can comprise at least one of independently adjustable: suspenders (e.g., attached from above); a lift, a jack, an hydraulic ram (e.g., attached from below); a robot (e.g., an industrial robot attached, for example, from above, below, a side, an edge, a corner, etc., and combinations thereof. An industrial robot can be, for example, an automatically controlled, reprogrammable, multipurpose programmable manipulator, such as in three or more axes, or a combination thereof.

The at least one seal can comprise, for example:

a first seal situated between the first upper portion and the second lower portion of the muffle, and in proximity to the first gap and the second gap of the pipes (the first seal minimizes heat loss and maintains heating consistency or uniformity within the chamber and in the area of the gaps between the pipes or portions of the muffle; for example, made of a refractory material, such as one or more bricks);

a second seal situated in proximity (e.g., between) the first upper portion and the second lower portion of the muffle, and in proximity to the first seal and distal to the first gap and the second gap of the pipes (The second seal minimizes thermal loss escaping through the first seal member. The second seal can be made of, for example, a flexible refractory material, such as Safil® alumina fibers);

a third seal situated in proximity to the first upper portion and the second lower portion of the muffle, and in proximity to the second seal member and distal to the first gap and the second gap of the pipes (The third seal can be, for example, a flexible or pliable material, such as silicone or rubber, that minimizes or eliminates air flow losses escaping through the first or second seal members);

or a combination thereof.

The lower pipe can have, for example, from 0 to 6 degrees of freedom and the first upper pipe can have, for example, from 0 to 6 degrees of freedom (DOF), including intermediate values and ranges, wherein at least one pipe has at least one degree of freedom. The lower pipe can have, for example, from 1 to 6 degrees of freedom and the first upper pipe can have, for example, from 1 to 6 degrees of freedom (DOF), including intermediate values and ranges, wherein at least one pipe has at least one degree of freedom.

The position of the muffle body in space can be defined by three components of translation and three components of rotation, and can have six degrees of freedom if not physically constrained. The six degrees of freedom can include, translational and rotational motion in three dimensional space. The three translational degrees of freedom include: moving up and down (i.e., heaving); moving left and right (i.e., swaying); and moving forward and backward (i.e., surging). The three rotational degrees of freedom include: tilting forward and backward (i.e., pitching); turning left and right (i.e., yawing); and tilting side to side (i.e., rolling). In embodiments, the lower pipe can be fixed in space and the first upper pipe can be adjusted in at least one of its six degrees of freedom (DOF). In embodiments, the first upper pipe can be fixed in space and the lower pipe can be adjusted in at least one of its six degrees of freedom (DOF).

The dimensions of the first gap and the second gap can be, for example, the same or different.

If the relative elevation of the first weir and the second weir of the upper pipe are the same, the resulting laminated sheet glass has a clad layer on each side of the core having substantially the same thickness, and if the relative elevation of the first weir and the second weir of the upper pipe are different, the resulting laminated sheet glass has a clad layer on each side of the core having a different thickness.

In embodiments, the separation dimension of the gaps between the bottom of the upper pipe and the lower pipe can be substantially equidistant across the entire span of the gap, or the separation dimension of the gaps between the bottom of the upper pipe and the lower pipe can be non-equidistant across the entire span of the gap, or a combination thereof.

In embodiments, the disclosure provides an apparatus for forming laminated sheet glass, comprising:

a lower pipe that provides a first glass stream that forms the core of the laminate; and a first upper pipe that provides a second glass stream onto the first glass stream that forms the first outer clad layer on the inner core of the laminate;

the top of the lower pipe and the bottom of the first upper pipe being separated from each other by a first gap on one long side and second gap on the other long side, and the position of the at least one of the lower pipe, the first upper pipe, or both pipes, is independently adjustable to control the dimensions of the first gap, the second gap, or both gaps.

The disclosed apparatus can further comprise an independent support system associated with each of the lower pipe and the first upper pipe, wherein the position of at least one of the lower pipe, the first upper pipe, or both pipes, is independently adjustable, directly or indirectly, by changing the position of the independent support system associated with at least one of the lower pipe, the first upper pipe, or both pipes.

The independent support system can be, for example, at least one of a suspension member that supports from above, below, a side, an edge, a corner, or combinations thereof. The suspension member can include, for example, a track and trolley system that can provide, for example, physical support, and convenient motion adjustment including, for example, translation motion, rotation motion, elevation motion or combinations thereof. In embodiments, the position of at least one of the lower pipe, the first upper pipe, or both pipes, of the disclosed apparatus can be remotely adjusted (e.g., an industrial robot system attached to either or both the first portion or second portion of the muffle). Remote adjustment capability can provide advantages, such as improved operator safety and improved equipment longevity, by avoiding high temperature conditions in or near the muffle. Alternative support and motion structures can include, for example, a gimbal architecture having 3- or 4-axes in a nested configuration, an articulated robot having, for example, two independent arms, and from 1 to 6 degrees of freedom (DOF) in a kinematic chain, and like structures. In embodiments, the support system associated with one or both of the lower pipe and the first upper pipe can independently adjust: vertically to control the separation dimension of the gaps between the bottom of the upper pipe and the top of the lower pipe; angularly to control the landing angle ($\Phi$) of the second liquid glass stream onto the first liquid glass stream; horizontally to control the off-set dimension of the gaps between the bottom of the upper pipe and the top of the lower pipe, or combinations thereof.

In embodiments, the disclosure provides a method for forming laminated sheet glass in the disclosed apparatus, comprising:

adjusting at least one of the first and the second weir elevations of the upper pipe to pre-determine the thickness ratios of the clad and core of the resulting laminate;

flowing a first glass stream over the lower pipe to form the core of the laminate; and simultaneously flowing a second glass stream over the first and second weirs of the upper pipe and then onto to the first glass stream to form the clad of the laminate on the core of the laminate.

The method can further comprise adjusting the upper portion of the muffle to change the first weir elevation, the second weir elevation, or both elevations of the upper pipe, to change location of the second glass stream onto to the first glass stream.

The first weir elevation, the second weir elevation, or both weir elevations of the upper pipe can be adjusted prior to use, in use, or after use, to provide relative glass thickness ratios of the core layer to clad layer laminate from 10:1 to 1:10, for example, 10:1 8:1, 6:1, 4:1, 3:1, 2:1, 1:1, 1:2, 1:3, 1:4, 1:6, 1:8, and 1:10, including intermediate values and ranges. Larger or smaller core layer to clad layer glass ratios are possible, such as 50:1, 40:1, 30:1, 20:1, 15:1, 12:1, 1:12, 1:15, 1:20, 1:30, 1:40, and 1:50, including intermediate values and ranges, but may require reconfiguration of the apparatus, such as selecting isopipes or glass stream feed pipes having different relative dimensions.

The thickness of the core layer can be, for example, from 1 micrometer to 1,000 micrometers and the thickness of the clad layer is from 1,000 micrometers to 1 micron, for example, the thickness of the core layer can be 5 micrometers and the thickness of the clad layer can be 1 micrometer, or a thickness ratios of the core layer to clad layers of the laminate is 5:2, and the thickness ratios of the core layer to each clad layer of the laminate is 5:1.

The method can further comprise having a plurality of upper pipes stacked above the upper pipe to provide a laminate sheet glass where the number of layers corresponds to one half the number of total upper pipes.

In embodiments, the molten glass feed or feeds that supply the lower pipe and the upper pipe can be provided by any suitable method or direction, for example, from the same end or side of the pipes, or the opposite ends or sides of the pipes.

In embodiments, the separation dimension or gap between the bottom of the upper pipe and the top of the lower pipe can be substantially equidistant across the entire span of the gap, i.e., uniform or substantially uniform separation dimension. In embodiments, the separation dimension or gap between the bottom of the upper pipe and the lower pipe can be, intentionally or inadvertently, non-equidistant across the entire span of the gap, i.e., substantially non-uniform. In embodiments, the separation dimension or gap between the bottom of the upper pipe and the top of the lower pipe can be a combination of uniform or substantially uniform separation dimension and non-uniform separation dimension, i.e., the respective isopipes can each be adjusted independently to provide the respective gaps having the same dimension on opposing sides, or provide the respective gaps having different dimensions on opposing sides.

In embodiments, the disclosure provides a method for forming laminated sheet glass in the abovementioned apparatus, comprising:

flowing a first liquid glass stream over the lower pipe to form the core of the laminate;

flowing a second liquid glass stream over the upper pipe, and then onto to the first liquid core glass stream to form the clad of the laminate on the solidified core glass of the laminate; and adjusting the relative spatial orientation of the lower pipe with respect to the upper pipe, before, during, or after the flowing of the glass streams, and combinations thereof.

In embodiments, the method of forming laminated sheet glass can further comprise independently adjusting one or both of the upper and lower pipes or corresponding muffle portions to change at least one of: the gap; the tilt angle ($\theta$), the landing angle ($\Phi$), drop line, or combinations thereof, of the second liquid glass stream onto to the first liquid glass stream.

If the core glass temperature in the lower pipe's trough is modified, the viscosity of the glass stream coming from the clad upper pipe is also modified, thus affecting the glass stream velocity from the upper pipe. This situation calls for a gap change, which can be readily accomplished by manipulating one or both of the disclosed upper and lower pipes or corresponding muffle portions to achieve the proper adjustment and compatible glass stream flows.

Referring to the Figures, FIG. 1 shows a schematic in cross section of a PRIOR ART double fusion apparatus (100) and process having the clad glass stream (120) from the upper isopipe (110) streaming onto the core glass stream (140) from the lower isopipe (130) across the gap (150).

FIG. 2 shows an exemplary side view of the PRIOR ART double fusion apparatus (100) and process of FIG. 1. FIG. 2 additionally shows the clad dam-to-dam dimension (160), which can be varied if desired, optional edge rolls or edge roller pairs (ER)(170) that can maintain consistency of or prevent attenuation of the width dimension of the core stream or core glass sheet, and optional pull roll or puller roller pairs (PR)(180) or tractor rolls that can maintain consistency of the laminate thickness and further regulate the speed of the lamination process.

FIG. 3 shows an exemplary schematic of the end view cross-section of the double fusion apparatus (100) of FIG. 1, within the disclosed apparatus (300) and process. The apparatus (300) includes a muffle structure having a first upper portion (320) having a top and at least two long sides and a second lower portion (340) having a bottom and at least two long sides. The bottom of the lower portion includes an opening (357) for egress of the glass laminate product. The muffle structure defines and provides a chamber occupied by the first upper pipe and lower pipe, i.e., the muffle provides a thermally insulated chamber that houses the isopipes. The muffle structure can further include or encompass one or more heat source element (350), for example, a glow bar or like heating elements. The muffle structure can further include or encompass a refractory liner (360)(aka: "dog house") made of, for example, a fire resistant material, such as silicon carbide, situated between the enclosure formed by the muffle and the chamber occupied by the first upper pipe lower pipe. The refractory liner includes an upper portion (325) and a lower portion (345), which liner portions protect the liquid glass streams from possible contamination from the heat source element (350) and can moderate the heating uniformity within the chamber. The upper portions (muffle; 320) and (liner; 325) and the lower portions (muffle; 340) and (liner; 345) are separated or divided by a seal region (355). The seal region (355)(inset) can include one or more optional seals having a different or redundant function, for example: a radiative seal (360) made of a fire resistant material, such as fire brick that retains large amounts of radiated heat within the pipe chamber; a thermal seal (370) made of a flexible fire resistant material, such as Safil fabric, that further reduces thermal losses; and a convective seal (380) made of a flexible material, such as rubber or silicone rubber, that reduces convective losses and retains additional amounts of heat within the pipe chamber. The thermal seal (370) can be, for example, attached to both the upper portion (320) and the lower portion (340) of the muffle. Alternatively, the thermal seal (370) can be, for example, attached to only the upper portion (320) of the muffle and loosely draped onto the lower portion of the muffle to permit greater freedom of movement between upper and lower portions of the muffle. The seal region (355) is a significant aspect of the disclosed apparatus and method in that the region can: maintain requisite similar temperature profiles within the interior of the upper and lower portions of the muffle; and permits the upper and lower portions of the muffle to be independently spatially adjusted. In embodiments, the upper and lower portions of the muffle can be independently adjusted in space to permit the gap region between the upper and lower isopipes to be adjusted to change the thickness ratio of the clad glass to the core glass in the drawn laminate product. In embodiments, the upper clad pipe can be fixed within the upper portion of the muffle, and the lower core pipe can be fixed within the lower portion of the muffle, so that a spatial adjustment of the upper portion of the muffle results in an accompanying spatial adjustment of the upper clad pipe. Each seal permits the independent adjustment of the spatial orientation of the upper and the lower portions of the muffle and consequently the relative orientation of the isopipes, and ultimately controls the relative thickness and uniformity of the clad and core streams produced by the glass lamination apparatus.

FIG. 4 shows a schematic cross section in side view of the disclosed apparatus incorporating the laminate draw fusion apparatus shown in FIGS. 1 and 2 within the disclosed apparatus (300) of FIG. 3.

Figure 5:
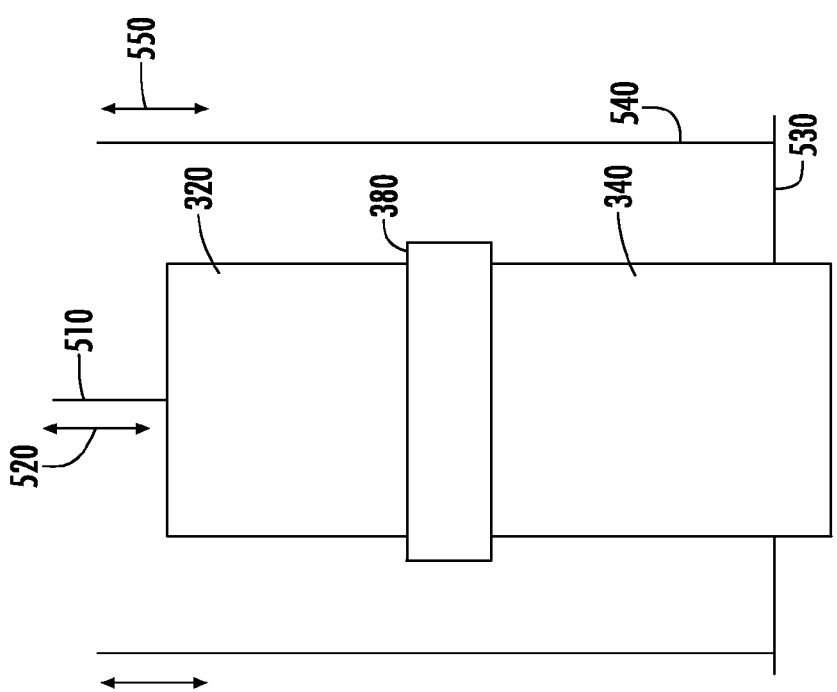
FIG. 5 illustrates an exemplary schematic in an elevation end view of one disclosed apparatus having independent overhead mechanisms for adjusting the relative spatial relation, that is, a relative translation movement, of the upper portion of the muffle (320) and the lower portion of the muffle (340).

FIG. 5 illustrates an exemplary schematic in an elevation end view of one disclosed apparatus having independent overhead mechanisms for adjusting the relative spatial relation, that is a relative translation movement, of the upper portion of the muffle (320) and the lower portion of the muffle (340). An exemplary convective seal (380) is situated between or around the area between the upper portion (320) and the lower portion (340) of the muffle. In embodiments, for example, the upper portion can be raised (520) using a first independent overhead adjustment mechanism (510), such as a chain or a rod attached to a motive source (not shown), while the lower portion can be held fixed, raised, or lowered (550) using a second independent overhead mechanism including, for example, one or more side arm (530) linkages, such as a rod, a pipe, a beam, or like structural element, attached to overhead mechanism (540), such as a chain, a rod, or like structural element, which mechanism is attached to a motive source (not shown), resulting in an increase in the gap (not shown) between the upper clad pipe and lower core pipe. In embodiments, for example, the lower portion (340) can be raised while the upper portion is held fixed or lowered resulting in a net decrease in the gap between the upper clad pipe and lower core pipe. In embodiments, for example, the converse movements to those foregoing movements in FIG. 5 can provide, respectively, a uniform increase in the gap between the upper clad pipe and lower core pipe. However, if the movements of the upper and lower portions are identical, no change in the gap between the upper clad pipe and lower core pipe results.

Figure 6:
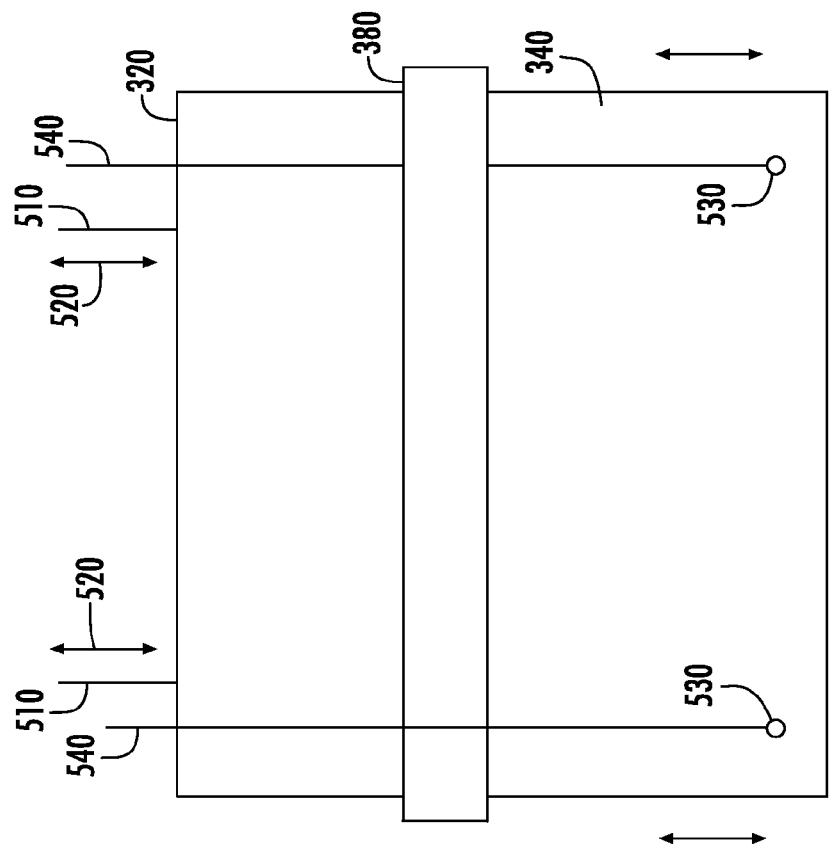
FIG. 6 illustrates an exemplary schematic in an elevation side view the disclosed apparatus movement of FIG. 5 having independent overhead mechanisms (510, 540) for adjusting the relative spatial relation (i.e., controlled "heaving") of the upper portion (320) of the muffle and the lower portion (340) of the muffle.

FIG. 6 illustrates an exemplary schematic in an elevation side view the disclosed apparatus movement of FIG. 5 having independent overhead mechanisms (510, 540) for adjusting the relative spatial relation (i.e., controlled "heaving") of the upper portion (320) of the muffle and the lower portion (340) of the muffle. FIGS. 5 and 6, taken together or considered separately, schematically demonstrate moving-up or moving-down relative motion (i.e., the "heaving" translational degree of freedom) of the muffle portions.

FIG. 7 illustrates an exemplary schematic in an elevation end view of one disclosed apparatus having independent overhead mechanisms for adjusting the relative spatial relation, that is another relative translation movement, of the upper portion (320) of the muffle and the lower portion (340) of the muffle. In embodiments, for example, the upper portion can be moved laterally left or right (720) using independent overhead mechanism (510), while the lower portion (340) can be held fixed or moved laterally (750) in the opposite direction (i.e., right or left) using independent overhead mechanism (540), resulting in a lateral offset or lateral increase in both gaps between the upper clad pipe and lower core pipe.

FIG. 8 illustrates an alternative exemplary schematic in an elevation side view of the disclosed apparatus movement of FIG. 7 having independent overhead mechanisms for adjusting the relative spatial relation (i.e., controlled "swaying") of the upper portion of the muffle and the lower portion of the muffle in the same plane. FIGS. 7 and 8, taken together or considered separately, schematically demonstrate left-to-right relative motion (i.e., the controlled swaying translational degree of freedom) in the same plane of the respective muffle portions.

A similar relative movement (not shown) can be envisioned for the upper portion being moved forward or backward from the plane of FIG. 7 (i.e., out of plane) while the lower portion is held fixed or moved in the opposite direction backward or forward out of the plane of FIG. 7, which movement taken together or considered separately, schematically demonstrates forward-to-backward or into- and out-of the paper plane relative motion (i.e., the "controlled surging" translational degree of freedom) of the respective muffle portions.

FIG. 9 illustrates an exemplary schematic in an elevation end view of one disclosed apparatus having independent overhead mechanisms (510, 540) for adjusting the relative spatial relation, specifically rotation, of the upper portion (320) of the muffle and the lower portion (340) of the muffle. In embodiments, for example, the upper portion (320) can be rotated counter-clockwise (930a), that is moved rotationally out-of-plane, for example, by lowering (e.g., 910) one end or side of the overhead mechanism (510a) and raising (e.g., 920) the other end or side of the overhead mechanism (510b), while the lower portion (340) is held fixed, or alternatively, rotated in either the same or opposite direction (e.g., counter clockwise in-plane (shown as 970a in FIG. 9 and as 970b in FIG. 10), or clockwise (not shown)) in a plane perpendicular to the rotational axis of the upper portion, for example, by lowering (e.g., 950) one end or side of the overhead mechanism (540) and raising (e.g., 960) the other end or side of the overhead mechanism (540) resulting in another unique change in the spatial relation between both gaps between the upper clad pipe and lower core pipe.

FIG. 10 illustrates in an elevation side view the disclosed apparatus movement described for FIG. 9. FIGS. 9 and 10, taken together or considered separately, schematically demonstrate independent adjustment of relative rotational motion of the muffle portions achieved using independent adjustment of the overhead mechanisms (510) and (540), that is by independently manipulating two different rotational degrees of freedom. The independent perpendicular axial rotations are summarized at the left of FIG. 9.

Figure 12:
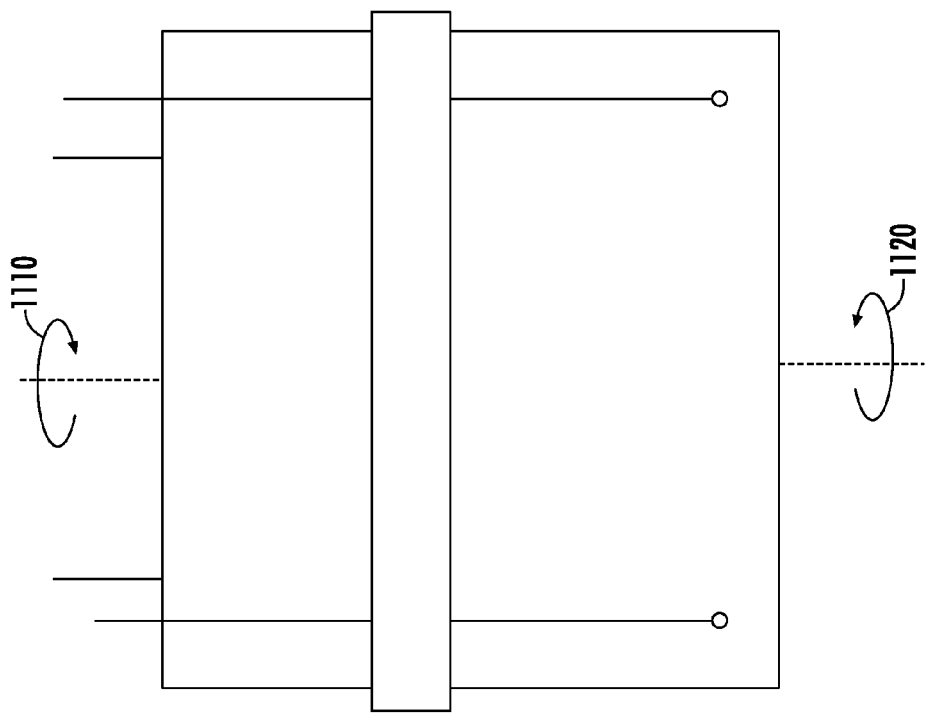
FIGS. 11 and 12 illustrates another exemplary schematic in an elevation end and side view, respectively, of one disclosed apparatus having independent overhead mechanisms (such as 510, 540 shown in FIGS. 9 and 10) for adjusting the relative spatial relation, specifically rotation, of the upper portion (320) of the muffle and the lower portion (340) of the muffle.
Figure 11:
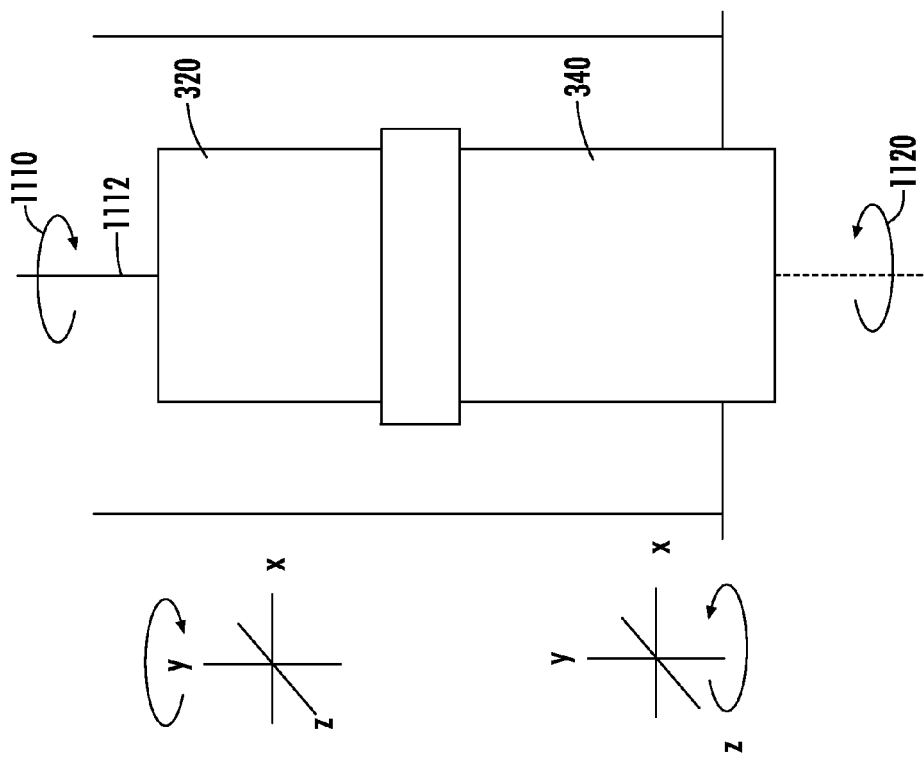

FIGS. 11 and 12 illustrates another exemplary schematic in an elevation end and side views, respectively, of one disclosed apparatus having independent overhead mechanisms (such as 510, 540 shown in FIGS. 9 and 10) for adjusting the relative spatial relation, specifically rotation, of the upper portion (320) of the muffle and the lower portion (340) of the muffle. In embodiments, for example, the upper portion (320) can be rotated clockwise (1110) about the y-axis (1112), that is moved rotationally out-of-plane, while the lower portion (340) is held fixed, or alternatively, is rotated in the opposite direction (i.e., counter clockwise out-of-plane (1120) about the y-axis (1112), resulting in still another unique change in the spatial relation between the gaps between the upper clad pipe and lower core pipe. FIGS. 11 and 12, taken together or considered separately, schematically demonstrate independent adjustment of relative rotational motion of the muffle portions achieved using independent adjustment of the overhead mechanisms (such as (510) and (540) shown in FIGS. 9 and 10), that is by independently manipulating two different rotational degrees of freedom. The independent opposite co-linear axial rotations are summarized at the left of FIG. 11.

Figure 14:
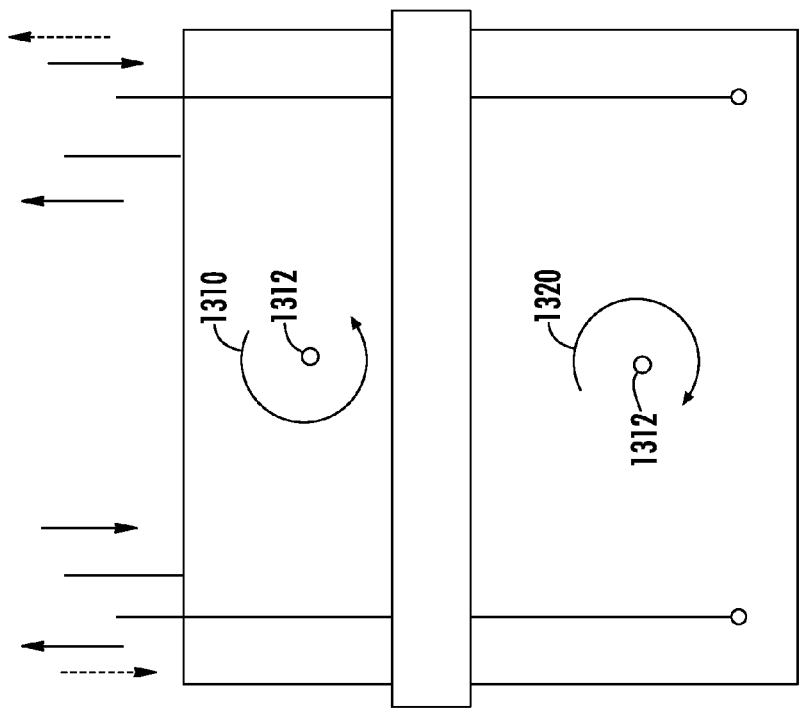
FIGS. 13 and 14 illustrates another exemplary schematic in an elevation end view and side view, respectively, of one disclosed apparatus having independent overhead mechanisms (such as 510, 540 shown in FIGS. 9 and 10) for adjusting the relative spatial relation, specifically rotation, of the upper portion (320) (or "tilt" (1310)) of the muffle and the lower portion (340) (or "tilt" (1320)) of the muffle.
Figure 13:
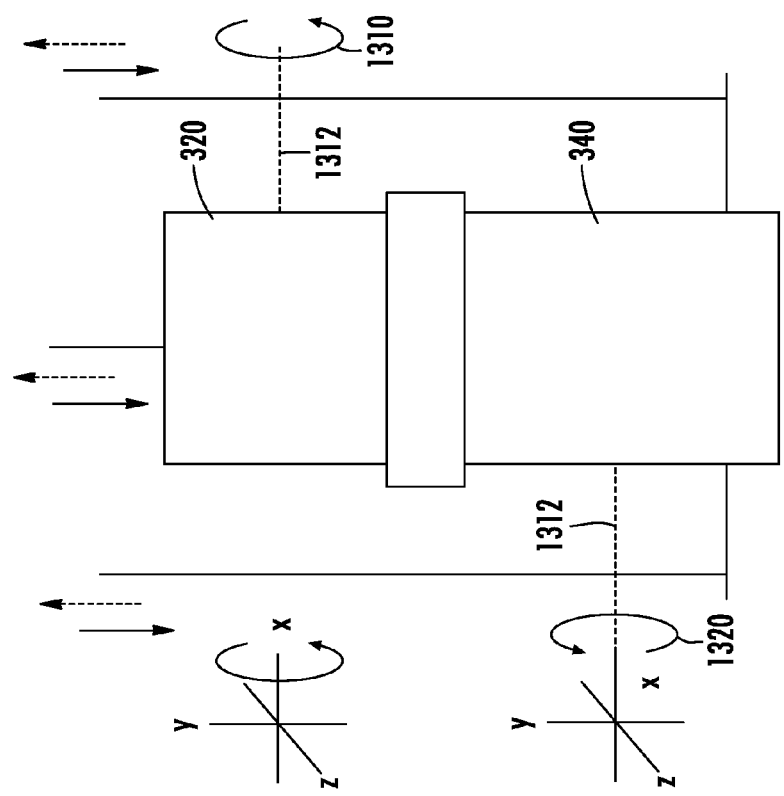

FIGS. 13 and 14 illustrates another exemplary schematic in an elevation end view and side view, respectively, of one disclosed apparatus having independent overhead mechanisms (such as 510, 540 shown in FIGS. 9 and 10) for adjusting the relative spatial relation, specifically rotation, of the upper portion (320) of the muffle and the lower portion (340) of the muffle. In embodiments, for example, the upper portion (320) can be rotated counter clockwise (1310) about the x-axis (1312), that is moved rotationally out-of-plane, while the lower portion (340) is held fixed, or alternatively, is rotated in the opposite direction (i.e., clockwise and out-of-plane (1320) about the x-axis (1312), resulting in still another unique change in the spatial relation between the gaps between the upper clad pipe and lower core pipe. In FIG. 14 the corresponding rotational motions of FIG. 13 are shown as an in-plane counter clockwise rotation (1310) about the x-axis and an opposing in-plane clockwise rotation (1320) about the x-axis. FIGS. 13 and 14, taken together or considered separately, schematically demonstrate independent adjustment of the relative rotational motion of the muffle portions achieved using independent adjustment of, for example, the aforementioned overhead mechanisms (510) and (540).

Figure 15:
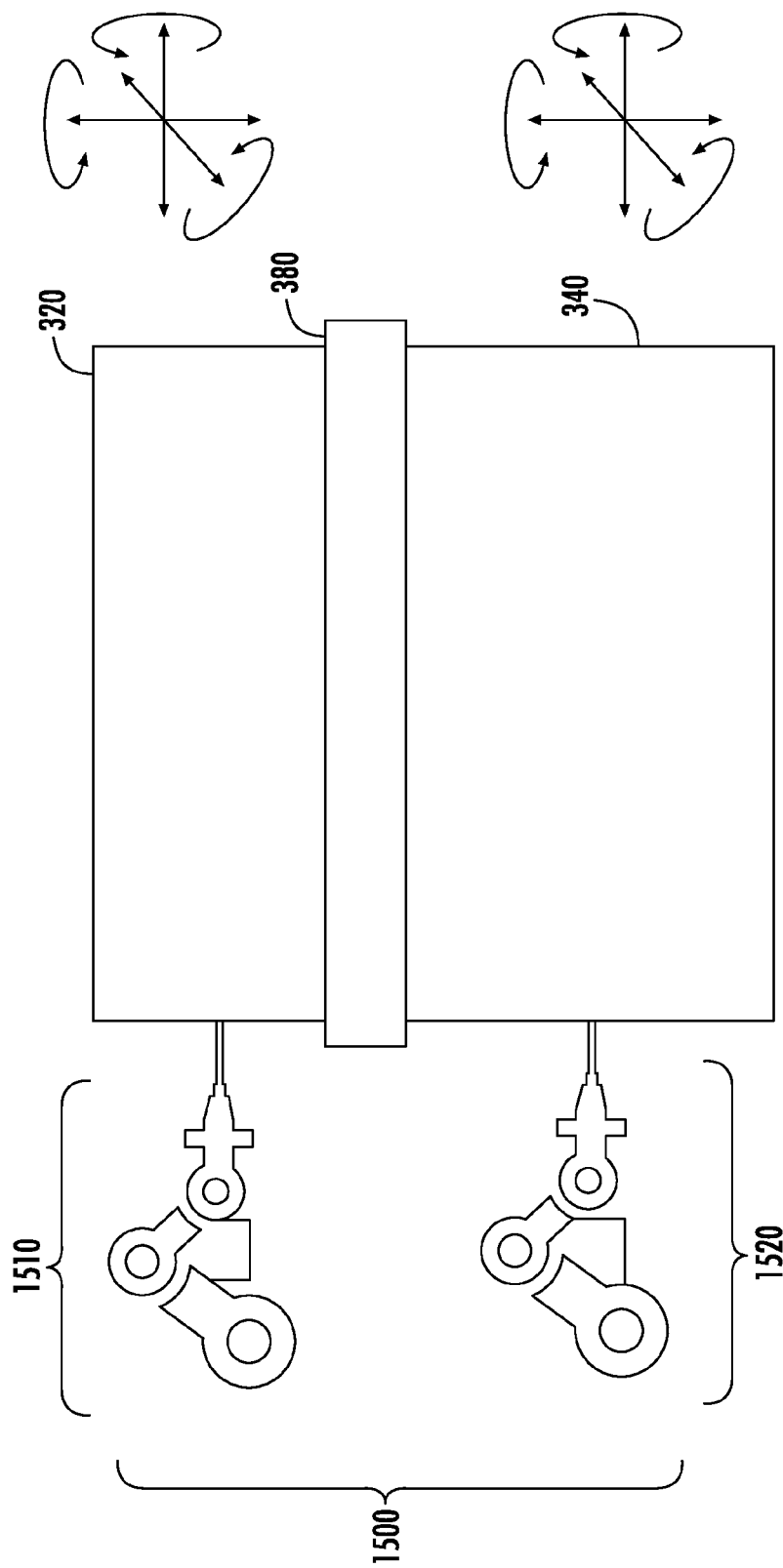
FIG. 15 illustrates another exemplary schematic in an elevation side view of one disclosed apparatus having independent adjustment or movement mechanisms.

FIG. 15 illustrates another exemplary schematic in an elevation side view of one disclosed apparatus having independent mechanisms, such as an industrial robot (1510) attached to the upper portion (320) of the muffle, and another industrial robot (1520) attached to the lower portion (340) of the muffle, for adjusting the relative spatial relation, specifically rotation, translation, or both, of the muffle portions. In embodiments, the configuration shown in FIG. 15 can simultaneously and independently adjust one or more, such as 1 to 6 of the possible translational and rotational motions or corresponding degrees of freedom of each of the upper portion (320) and the lower portion (340) to predictably change in the spatial relation between either or both of the gaps between the upper clad pipe and lower core pipe. The three rotational degrees of freedom that can be independently adjusted include: tilting forward and backward (i.e., pitching); turning left and right (i.e., yawing); and tilting side to side (i.e., rolling or banking). In embodiments, a single robot (1500) can be adapted to include or integrate both independent adjustment mechanism of the two robots mentioned above. The omni-directional adjustable degrees of freedom are schematically summarized by the xyz-axes at the right of FIG. 15.

Figure 16:
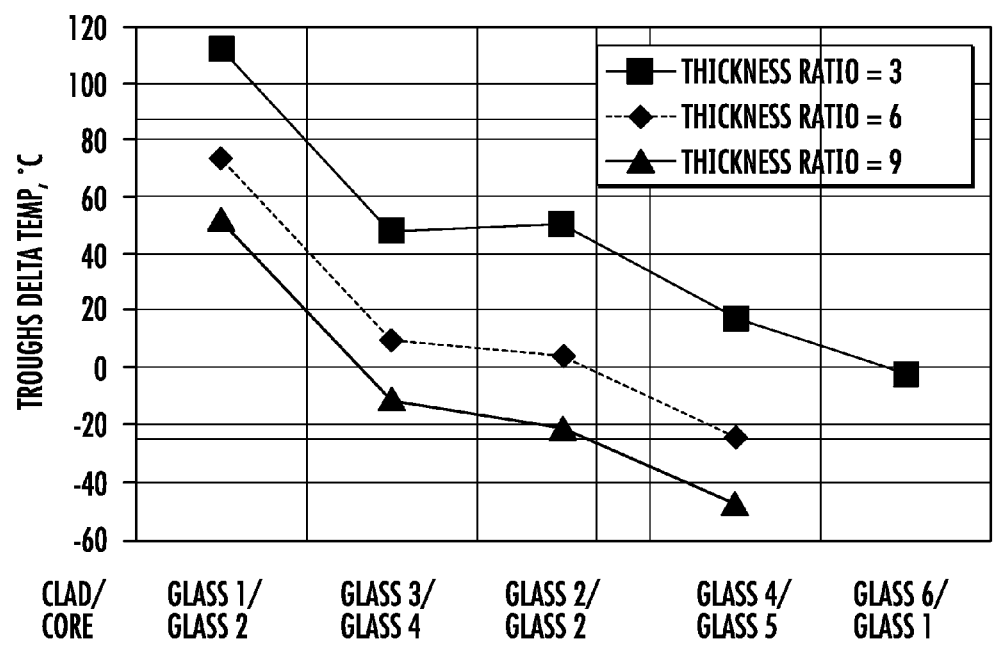
FIG. 16 shows an example graph of various possible combinations of the same or different glasses and representative thickness ratios that can be accomplished with the disclosed apparatus.

FIG. 16 shows an example graph of various possible combinations of glasses and representative thickness ratios (clad:core) that can be accomplished with the disclosed apparatus. The thermal capability and particularly temperature delta (difference) between the upper and lower isopipe troughs can create an operating window for the apparatus. An example of an operating window for one apparatus is illustrated by the middle section on the graph between about −25° C. and about 85° C. for representative core and clad laminate combinations: Glass 1/Glass 2; Glass 3/Glass 4; Glass 2/Glass 2; Glass 4/Glass 5; and Glass 6/Glass 1, where each Glass 1 through 6 has a different viscosity curve. The thickness ratio (TR) is defined as TR=(core thickness)/(2clad thickness). The "clad and core trough delta temperature" is defined as Δt=(clad temperature−core temperature).

In embodiments, the respective isopipes can be independently moved in any one or more six degrees of freedom to alter or adjust the gap (150) by any suitable mechanism, such as a remotely situated servo motor connected to screw-lifter, which is in turn be connected to a portion of the respective muffle positions, such as by using an adjustment hoist or robot.

In embodiments, the disclosed apparatus having independently moveable muffle portions can be adjusted to change a landing angle (Φ) of zero to a second orientation having a non-zero landing angle (Φ) of about 0.1° to 2°, about 0.05° to 2°, about 0.05° to 1°, 0.05° to 0.5°, 0.05° to 0.25°, 0.01° to 0.25°, and like landing angle values, including intermediate values and ranges.

In embodiments, changing the gap, i.e., the separation dimension, causes a change in the velocity of the molten glass or melt flowing from the upper clad pipe onto the molten glass melt flowing from the lower core pipe. Specifically, increasing the gap (140) separation dimension can causes a relative increase in the flow velocity of the glass melt flowing from the upper clad pipe onto the lower melt flow. A decrease in the gap separation dimension typically can causes a relative decrease in the flow velocity of the glass melt flowing from the upper clad pipe onto the lower melt flow.

In embodiments, if at the point of junction or confluence, the clad glass stream is faster than the core glass stream, the clad glass stream will begin to lap creating a "piling effect". This can have an impact on both the apparent glass mass distribution along the length of the pipe and the apparent glass mass distribution along the line of draw. This can cause sheet thickness variations across the draw and down the draw. A secondary issue can be the high potential for trapping air within the clad, core, or both, or between the clad and core layers, which can create seeds at the interface between the two different glass layers. This secondary issue can also be corrected by changing the gap, for example reducing the speed of the upper clad glass flow. Slowing the speed of the upper clad glass flow can be achieved by, for example, reducing the relative gap size.

In embodiments, there can be situations when one of the pipes needs to be tilted to account for flow or viscosity changes due to altering process parameters. The tilt can cause a non-uniform gap between the two pipes. If the distance between the two pipes is not uniform, velocity non-uniformity can occur down the length of the pipe, causing some of the above-mentioned issues. The issues can be cured or circumvented with the disclosed apparatus and methods. The relative tilt non-uniformity condition is typically not an issue with a single fusion pipe.

In embodiments, the laminate glass article can comprise, consist essentially of, or consist of one of a soda lime silicate glass, an alkaline earth aluminosilicate glass, an alkali aluminosilicate glass, an alkali borosilicate glass, and combinations thereof. In embodiments, the glass article can include, for example, an alkali aluminosilicate glass having the composition: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the alkali metal modifiers are alkali metal oxides. In embodiments, the alkali aluminosilicate glass substrate can be, for example: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. In embodiments, the alkali aluminosilicate glass substrate can be, for example: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤MgO+CaO≤10 mol %. In embodiments, the alkali aluminosilicate glass substrate can be, for example: 64-68 mol % $SiO_2$; 12-16 mol % $Na_2O$; 8-12 mol % $Al_2O_3$; 0-3 mol % $B_2O_3$; 2-5 mol % $K_2O$; 4-6 mol % MgO; and 0-5 mol % CaO, wherein: 66 mol %≤$SiO_2+B_2O_3+CaO$≤69 mol %; $Na_2O+K_2O+B_2O_3+MgO+CaO+SrO$>10 mol %; 5 mol %≤MgO+CaO+SrO≤8 mol %; ($Na_2O+B_2O_3$)−$Al_2O_3$≤2 mol %; 2 mol %≤$Na_2O−Al_2O_3$≤6 mol %; and 4 mol %≤($Na_2O+K_2O$)−$Al_2O_3$≤10 mol %. In embodiments, the alkali aluminosilicate glass can be, for example: 50-80 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt % (MgO+CaO+SrO+BaO); 0-3 wt % (SrO+BaO); and 0-5 wt % ($ZrO_2+TiO_2$), wherein 0≤($Li_2O+K_2O$)/$Na_2O$≤0.5.

In embodiments, the alkali aluminosilicate glass can be, for example, substantially free of lithium. In embodiments, the alkali aluminosilicate glass can be, for example, substantially free of at least one of arsenic, antimony, barium, or combinations thereof. In embodiments, the glass can optionally be batched with 0 to 2 mol % of at least one fining agent, such as $Na_2SO_4$, NaCl, NaF, NaBr, $K_2SO_4$, KCl, KF, KBr, $SnO_2$, and like substances, or combinations thereof.

In embodiments, the selected glass or glasses can be, for example, down drawable, i.e., formable by methods such as slot draw or fusion draw. In these instances, the glass can have a liquidus viscosity of at least 130 kpoise. Examples of alkali aluminosilicate glasses are described in commonly owned and assigned U.S. patent application Ser. No. 11/888, 213, to Ellison, et al., entitled "Down-Drawable, Chemically Strengthened Glass for Cover Plate," and its priority applications. The glass compositions can be any suitable glass substrate or like substrates, and can include, for example, a glass composition 1 through 11, or a combination thereof, listed in Table 1.

TABLE 1

Representative glass substrate compositions.

| Oxides (mol %) | 1 | 2 | 3 | 4 | 5 | 6 | 7 | 8 | 9 | 10 | 11 |
|---|---|---|---|---|---|---|---|---|---|---|---|
| $SiO_2$ | 66.16 | 69.49 | 63.06 | 64.89 | 63.28 | 67.64 | 66.58 | 64.49 | 66.53 | 67.19 | 70.62 |
| $Al_2O_3$ | 10.29 | 8.45 | 8.45 | 5.79 | 7.93 | 10.63 | 11.03 | 8.72 | 8.68 | 3.29 | 0.86 |
| $TiO_2$ | 0 | — | — | — | — | 0.64 | 0.66 | 0.056 | 0.004 | — | 0.089 |
| $Na_2O$ | 14 | 14.01 | 15.39 | 11.48 | 15.51 | 12.29 | 13.28 | 15.63 | 10.76 | 13.84 | 13.22 |
| $K_2O$ | 2.45 | 1.16 | 3.44 | 4.09 | 3.46 | 2.66 | 2.5 | 3.32 | 0.007 | 1.21 | 0.013 |
| $B_2O_3$ | 0.6 | — | 1.93 | — | 1.9 | — | — | 0.82 | — | 2.57 | — |
| $SnO_2$ | 0.21 | 0.185 | — | — | 0.127 | — | — | 0.028 | — | — | — |
| BaO | 0 | — | — | — | — | — | — | 0.021 | 0.01 | 0.009 | — |
| $As_2O_3$ | 0 | — | — | — | — | 0.24 | 0.27 | — | — | 0.02 | — |
| $Sb_2O_3$ | — | — | 0.07 | — | 0.015 | — | 0.038 | 0.127 | 0.08 | 0.04 | 0.013 |
| CaO | 0.58 | 0.507 | 2.41 | 0.29 | 2.48 | 0.094 | 0.07 | 2.31 | 0.05 | 7.05 | 7.74 |
| MgO | 5.7 | 6.2 | 3.2 | 11.01 | 3.2 | 5.8 | 5.56 | 2.63 | 0.014 | 4.73 | 7.43 |
| $ZrO_2$ | 0.0105 | 0.01 | 2.05 | 2.4 | 2.09 | — | — | 1.82 | 2.54 | 0.03 | 0.014 |
| $Li_2O$ | 0 | — | — | — | — | — | — | — | 11.32 | — | — |
| $Fe_2O_3$ | 0.0081 | 0.008 | 0.0083 | 0.008 | 0.0083 | 0.0099 | 0.0082 | 0.0062 | 0.0035 | 0.0042 | 0.0048 |
| SrO | — | — | — | 0.029 | — | — | — | — | — | — | — |

Table 2 provides an example listing of one disclosed system that discusses various aspects of the degrees of movement. The column labeled "Operation Range" demonstrates tilt direction (Φ) movement of either pipe for an apparatus covering a particular range of applications. Table 2 is exemplary and is not limited to the listed ranges. For instance, an apparatus having operating ranges, for example, that are doubled, tripled, quadruple, etc., in any operation can be beneficial.

In embodiments, the apparatus can provide a tilt flush range of, for example, −4° of arc, that is the bottom trough angle having both troughs tilted −4° which can be beneficial in post laminate processing for cleaning the pipes for change over.

The disclosure has been described with reference to various specific embodiments and techniques. However, it should be understood that many variations and modifications are possible while remaining within the scope of the disclosure.

TABLE 2

| Movement | Direction | Operation Range (gap dimension) | Purpose |
|---|---|---|---|
| Tilt | clad relative to core | +/−1° | Vary flow density. |
| Tilt | both pipes together | +/−1° | Vary thickness ratio |
| Roll | clad relative to core | +/−1° | Control left to right clad thickness mismatch. |
| Roll | both muffles together | +/−1° | Alignment with gravity vector |

TABLE 2-continued

| Movement | Direction | Operation Range (gap dimension) | Purpose |
|---|---|---|---|
| Sliding | both pipes together | +/−2.0" | Align inlet tubes with downcomers. |
| Sliding | clad relative to core | +/−1.0" | Adjust offset due to tilt. |
| Left-Right (1 pipe fixed; 1 pipe moving laterally) | both pipes together | 0 | For adjusting the landing point of clad glass on core glass. |
| Left-Right | clad relative to core | +/−0.25" | Alignment of two pipes with each other. |
| Twist (horizontal) | both pipes together | 0 | Alignment with BOD equipment |
| Twist (horizontal) | clad relative to core | 0 | Alignment of two pipes with each other |
| Up - Down (gap changes) | clad-core gap | 0.5"-3" | — |

What is claimed is:

1. An apparatus for forming laminated sheet glass, comprising:
   a lower pipe that provides a first glass stream of the core of the laminate; and
   a first upper pipe having a first weir and a second weir, that provides a second glass stream onto the first glass stream, the second glass stream forms a first outer clad layer on the inner core of the laminate;
   a two piece muffle comprising:
      a first upper portion having a top and at least two long sides; and
      a second lower portion having an open bottom and at least two long sides, the first and second muffle portions define a chamber occupied by the first upper pipe and the lower pipe respectively, the first upper portion and second lower portion define a first gap that physically separates and is situated between the first and second portions;
   a two piece refractory liner situated between the muffle and the chamber occupied by the first upper pipe and lower pipe, the refractory liner having an upper portion and a lower portion that define a second gap that physically separates and is situated between the refractory liner first and second portions;
   at least one gap seal situated near the first gap between the bottom of the first upper portion and the top of the second lower portion of the muffle;
   at least one heat source within at least one of the first upper portion and the second lower portion of the muffle; and
   an adjustment system operably adapted to change the relative position of at least one of:
   the upper portion of the muffle with respect to the lower portion of the muffle;
   the first weir with respect to the second weir of the first upper pipe; and
   a first gap and a second gap between the first upper pipe and the lower pipe.

2. The apparatus of claim 1 wherein the adjustment system independently supports each of the upper and lower muffle portions from above, below, a side, an edge, a corner, or a combination thereof.

3. The apparatus of claim 1 wherein the adjustment system comprises at least one of independently adjustable: suspenders; a lift, a jack, an hydraulic ram; a robot, or a combination thereof.

4. The apparatus of claim 1 wherein the at least one gap seal comprises:
   a first seal situated between the first upper portion and the second lower portion of the muffle, and in proximity to the first gap and the second gap of the pipes;
   a second seal situated in proximity the first upper portion and the second lower portion of the muffle, and in proximity to the first seal and distal to the first gap and the second gap of the pipes;
   a third seal situated in proximity to the first upper portion and the second lower portion of the muffle, and in proximity to the second seal member and distal to the first gap and the second gap of the pipes;
   or a combination thereof.

5. The apparatus of claim 1 wherein the lower pipe has from 1 to 6 degrees of freedom and the first upper pipe has from 1 to 6 degrees of freedom.

6. The apparatus of claim 1 wherein the dimensions of the first gap and the second gap are the same or different.

7. The apparatus of claim 1 wherein if the relative elevation of the first weir and the second weir are the same, the resulting laminated sheet glass has a clad layer on each side of the core having substantially the same thickness, and if the relative elevation of the first weir and the second weir are different, the resulting laminated sheet glass has a clad layer on each side of the core having a different thickness.

8. The apparatus of claim 1 wherein the separation dimension of the gaps between the bottom of the upper pipe and the top of the lower pipe is substantially equidistant across the entire span of the gap, or the separation dimension of the gaps between the bottom of the upper pipe and the top of the lower pipe is non-equidistant across the entire span of the gap, or a combination thereof.

9. A method for forming laminated sheet glass in the apparatus of claim 1, comprising:
   adjusting at least one of the first and the second weir elevations of the upper pipe to pre-determine the thickness ratios of the clad and core of the resulting laminate;
   flowing a first glass stream over the lower pipe to form the core of the laminate;
   simultaneously flowing a second glass stream over the first and second weirs of the upper pipe and then onto to the first glass stream to form the clad of the laminate on the core of the laminate.

10. The method of claim 9 further comprising adjusting the upper portion of the muffle to change the first weir elevation, the second weir elevation, or both elevations of the upper pipe, to change location of the second glass stream onto to the first glass stream.

11. The method of claim 9 wherein the first weir elevation, the second weir elevation, or both elevations of the upper pipe are adjusted prior to use, in use, or after use, to provide glass thickness ratios of the core layer to clad layer laminate from 10:1 to 1:10.

12. The method of claim 11 wherein the thickness of the core layer is from 1 micrometers to 1,000 micrometers and the thickness of the clad layer is from 1,000 micrometers to 1 microns.

13. The method of claim 9 further comprising having a plurality of upper pipes stacked above the upper pipe to provide a laminate sheet glass where the number of layers corresponds to one half the number of total upper pipes.

* * * * *